United States Patent [19]
Piccard

[11] Patent Number: 4,836,471
[45] Date of Patent: Jun. 6, 1989

[54] NAVIGATIONAL VENT FOR HOT AIR BALLOONS

[76] Inventor: Don Piccard, 1445 E. River Rd., Minneapolis, Minn. 55414

[21] Appl. No.: 66,318

[22] Filed: Jun. 25, 1987

Related U.S. Application Data

[63] Continuation-in-part of Ser. No. 904,480, Sep. 8, 1986, abandoned.

[51] Int. Cl.⁴ .............................................. B64B 1/64
[52] U.S. Cl. .................................................... 244/99
[58] Field of Search ..................... 244/30, 31, 99, 145, 244/152, 96, 97

[56] References Cited

U.S. PATENT DOCUMENTS

| | | | |
|---|---|---|---|
| 37,667 | 2/1863 | Shaw | 244/127 |
| 1,349,335 | 8/1920 | Gunmeterp | 244/99 |
| 2,404,659 | 7/1946 | Rohulick | 244/145 |
| 3,534,927 | 10/1970 | Harding | 244/145 |
| 4,042,192 | 8/1977 | Walter | 244/99 |
| 4,090,682 | 5/1978 | Parsons | 244/99 |
| 4,402,476 | 9/1983 | Wiederkehr | 244/99 |

FOREIGN PATENT DOCUMENTS 2360089 3/1978 France ................................. 244/99

*Primary Examiner*—Galen Barefoot
*Attorney, Agent, or Firm*—Orrin M. Haugen; Thomas J. Nikolai; Frederick W. Niebuhr

[57] ABSTRACT

An improved cap valving means for hot air load-carrying balloons which is designed to be opened and/or closed rapidly so as to assist in control of the balloon. The valve and/or vent includes a disc which may be opened by applying a force to a pull cord, and wherein the applied force is provided with an improved mechanical advantage so as to unseat the disc and thereby open the interior of the balloon envelope to the ambient. In addition to the pull cord, the control cord includes a number of disc cords which are spaced at substantially equally arcuately spaced points around the circumference of the disc, to assist in guiding the disc in its opening and closing motion.

7 Claims, 6 Drawing Sheets

NAVIGATIONAL VENT FOR HOT AIR BALLOONS

CROSS-REFERENCE TO RELATED APPLICATION

This is a continuation-in-part of my co-pending application Ser. No. 06/904,480, filed Sept. 8, 1986, entitled "NAVIGATIONAL VENT FOR BALLOONS" now abandoned.

BACKGROUND OF THE INVENTION

The present invention relates generally to an improved hot air balloon structure, and more particularly to a hot air load-carrying balloon structure which is equipped with an improved cap valving means which may be controllably opened rapidly so as to assist in deflation, and thereby aid in descent and landing.

Hot air balloons have been utilized for an extended period of time, with this type of structure having contributed to the first known or recorded flight by man. While they are structurally different from gas balloons, they are responsible for an increased interest as a sporting activity because of the relatively low running costs, and a significant safety record.

In flight, a hot air balloon may assume what has been defined as a natural shape, that is a relatively wide and enlarged diameter at the top, tapering inwardly toward the bottom in accordance with a shape created by the internal pressure. Load tapes are provided to support loads being carried by the balloon, including the occupants of the basket, the burner, and the like. To provide heat for the air within the balloon envelope, a burner is provided which is normally fueled by propane gas or the like.

The base of the balloon is provided with a relatively large diameter opening in order to permit heat from the burner to enter the envelope. The lift for the structure is provided by periodically or intermittently firing the burner so as to increase the temperature of the air within the envelope. Ascent and descent is accordingly accomplished in this fashion. Because of the heat capacity of air, and the time required to achieve cooling and thus descent, the hot air balloons are normally provided with an opening at or near the pole cap, so as to permit the egress of hot air, to be replaced by cooler air.

In the past, a ripping panel had been typically employed at or near the top of the balloon, the ripping panel being opened upon landing so as to permit rapid deflation of the balloon. Typically, ripping panels are held in closed disposition with a self-fastening material such as Velcro or the like.

In order to provide a proper envelope material, woven tear-resistant materials such as nylon or the like is typically utilized, and treated with a film-forming substance such as polyurethane or the like in order to reduce porosity and increase the load carrying and flight characteristics. Such materials are, of course, commercially available.

SUMMARY OF THE INVENTION

In accordance with the present invention, an improved valving arrangement is provided adjacent the polar cap of the envelope, with the valving arrangement comprising a disc, functioning as a poppet, which is removably and releasably secured to the balloon envelope adjacent the disc periphery. Means are provided for selectively positioning the disc in the port formed within the balloon envelope, with the positioning means providing for positive fixation and controllable opening and closing of the disc valve.

The disc preferably has a diameter which is substantially greater than the diameter of the envelope port, providing for an annular lip sealing zone radially outwardly of the port. Control cord means are provided, which include a clew (as in hammock clew) disposed generally concentrically of the disc with an elastic retraction cord being anchored to the balloon structure at one end, and to the cord at the other. In one embodiment, a plurality of elastic disc cords extend radially outwardly from the disc and are anchored to the disc at substantially equal arcuately spaced points therearound, preferably at the anchor points of the clew. These disc cords extend radially outwardly of the disc and have central segments thereof which pass about pulley means, with the pulley means also being disposed radially outwardly of the disc, and anchored to the envelope. A pull cord is, in turn, coupled to the becket of the clew at a point wherein forces applied to the pull cord will be directed to the individual disc cords, and thus provide for controlled opening of the valve disc. In addition, the valve disc is designed so that upon release of the pull cord, the disc will be returned to its sealing disposition on the envelope structure.

In one embodiment, the disc may be provided with a reefing line so as to provide a means to choke the disc radially inwardly by means of the provision of a plurality of arcuately spaced rings disposed radially inwardly around the disc, and with a reefing line passing therethrough so as to permit the rings to be drawn inwardly and reduce the diametrical dimension of the disc. Such an arrangement provides an effective means to provide for adequate total deflation.

Therefore, it is a primary object of the present invention to provide an improved hot air load-carrying balloon structure which is provided with a polar cap valving means in the form of a disc which is removably and releasably secured to the balloon envelope for selective positioning of the disc in a port formed within the envelope, and with improved retention and release means being provided for the disc structure.

It is yet a further object of the present invention to provide an improved disc vent for installation in the cap zone of hot air load-carrying balloons, wherein the disc may be controllably and selectively positioned in either opened or closed dispositions.

Other and further objects of the present invention will become apparent to those skilled in the art upon a study of the following specification, appended claims, and accompanying drawings.

DESCRIPTION OF THE PREFERRED EMBODIMENT

Figure 1:
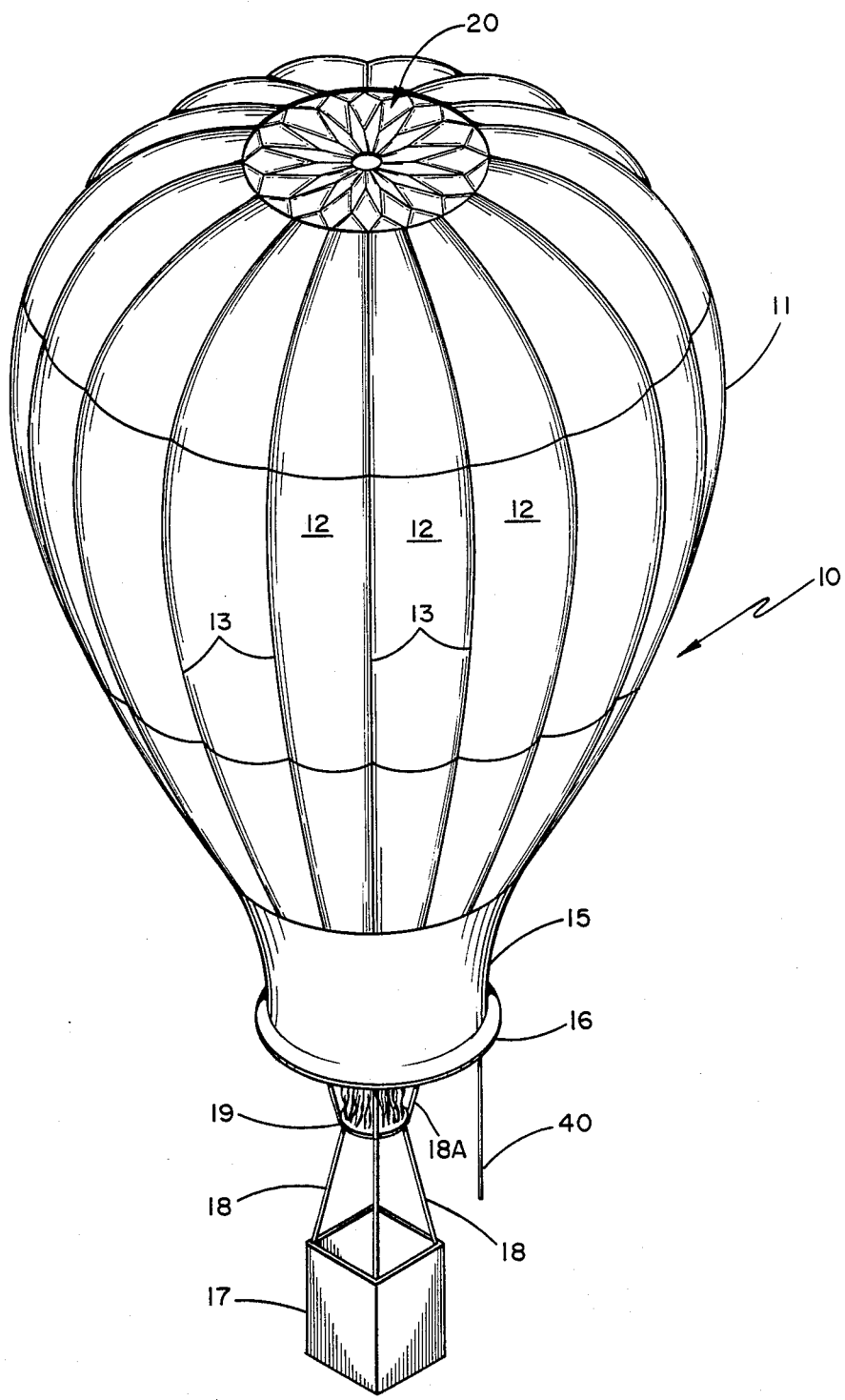
FIG. 1 is a perspective view of a hot air load-carrying balloon structure fabricated in accordance with the present invention, and illustrating the cap disc means in closed disposition.

In accordance with the preferred modification of the present embodiment, the inflated hot air load-carrying balloon structure generally designated 10 comprises a closed envelope or body 11 comprising a plurality of individual gores 12—12 sewn together along mating load tapes at joint lines or seams 13—13 so as to form the closed structure. While various non-porous materials may be employed, a nylon weave which has been demonstrated to be tear-resistant, treated with a film of polyurethane, may be suitably employed. Such materials are, of course, well known in the art and are furthermore commercially available.

The balloon structure further includes a throat or mouth zone 15 terminating in a stiffening ring or the like as at 16. A crew-carrying basket 17 is arranged to be suspended from the burner by load lines 18—18. A burner 19 is further suspended from the structure, such as from the seams 13 by means of load lines 18A.

Burner 19 is conventional, and is fueled by the fuels normally being used for hot air ballooning, such as propane or the like. Other fuels, of course, have been utilized from time to time, but the most popular fuel at the present time is liquid propane.

Figure 2:
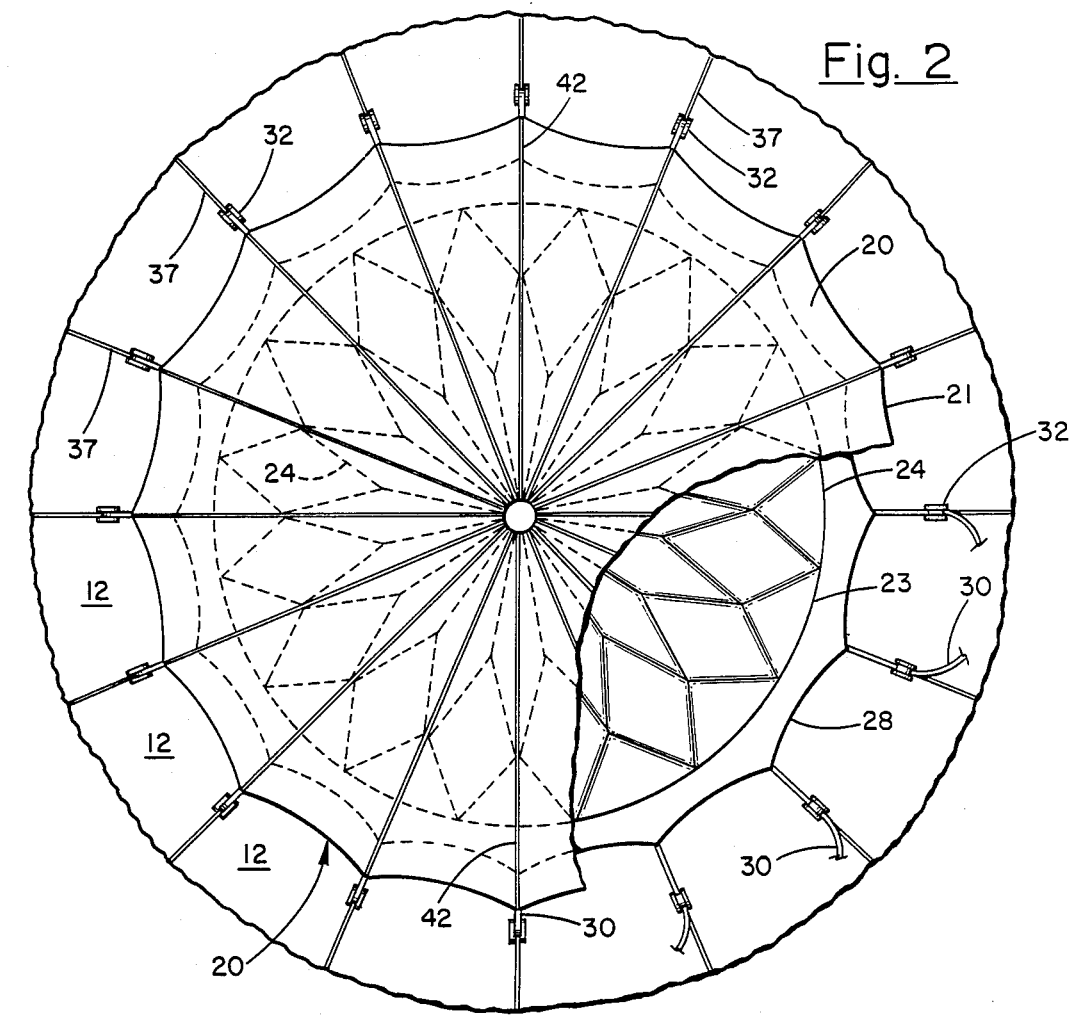
FIG. 2 is a fragmentary bottom plan view taken from the interior or inside of the balloon envelope, and illustrating the top vent portion of the balloon, with FIG. 2 being taken on a slightly enlarged scale, showing the detail of the disc.

Attention is now directed to FIG. 2 of the drawings wherein the top cap valving disc is shown. The disc generally designated 20 is arranged to be removably and releasably secured to the balloon envelope adjacent its periphery, as at 21. Specifically, a port is formed in the balloon envelope 11, as at 23, with the opening or port being controllably sealed by disc 20. A netting as at 24 is provided externally of disc 20 in order to assist in retaining the disc in a controlled disposition within the balloon, and to prevent inversion or extrusion during operation. The netting is, in effect, an extension of seams 13, providing the continuity of load from elements 18, 18A, and 13. In this connection, therefore, netting 24 provides a number of spaced-apart reinforcing lines assuming the configuration of a number of polygons, normally of a diamond-like configuration. Curved lines may also be obtainable with this arrangement. This arrangement is best shown in FIGS. 1 and 2. The physical arrangement of the netting provides a self-compensating load distribution feature similar to that of a purse net. Such equalization of forces is, of course, desirable in load-carrying structures such as hot air balloons. In this fashion, the net 24 is made up of compartmentalized sections and thereby serve to self-equalize tensile forces therewithin.

Disc 20 is maintained in place by cord means, such as illustrated at 30—30 in FIG. 2, and discussed and described more fully hereinafter.

As is conventional in ballooning, the throat area 15 provides for communication between the envelope interior and the ambient. The heated air within the envelope provides for displacement of ambient air, and thus provides the lift. As an added advantage of this feature, the bell mouth which establishes a portion of the venturi structure enhances flow around the burner flame, and assists in rapid reinflation of the balloon structure in flight. Also, on descent, the structure may, in certain instances, function as a ram-air opening.

Figure 3:
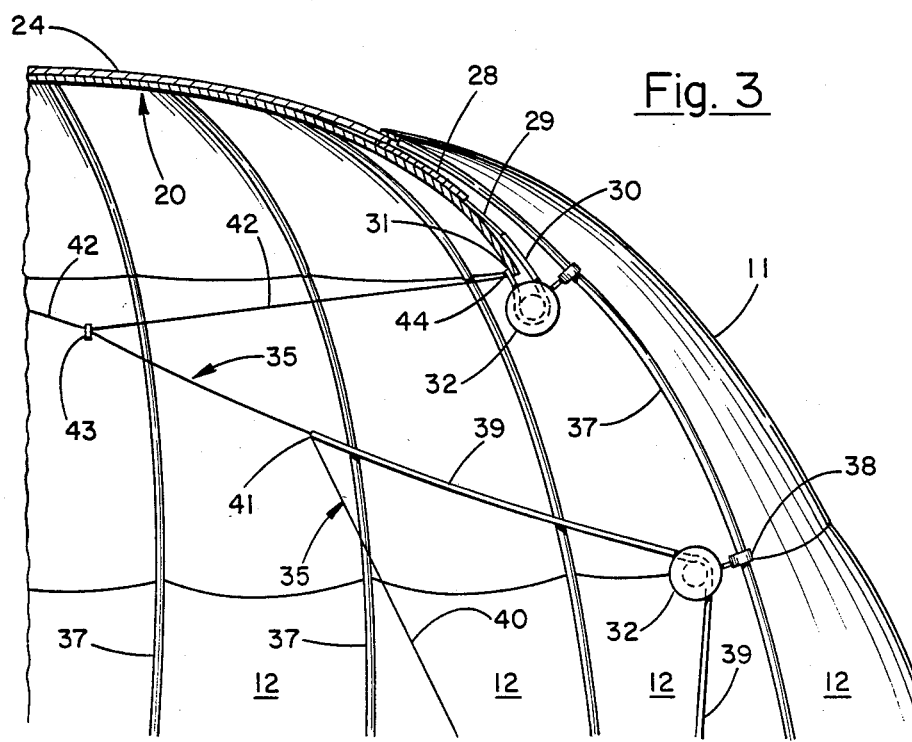
FIG. 3 is a side elevational view, partly in section, and also on a slightly enlarged scale, and illustrating the manner in which the valving disc is disposed while closed.

With particular attention now being directed to FIG. 3 of the drawings, it will be seen that a lip seal zone is shown as at 28, with the lip seal zone being defined by a lip tie-back loop as at 29. It will be noted that the peripheral edge of the disc is held outwardly beyond the opening formed in the balloon envelope. Accordingly, the envelope lip seals against the disc. A length of elastic line or cord is provided as at 30, with the other end of line 30 being secured to the disc 20 adjacent its peripheral edge. In this fashion, therefore, the lines 30 interact between the disc 20 and lip as at 31. Pulley 32 is provided to control the direction of line 30 within the arrangement and also provides for a better angular disposition for the top cap valving disc.

Control cord means are provided, as shown generally at 35. The control cord means are coupled to the disc through the clew and provide a substantially continuous line which extends from the disc to the free end, with the free end being accessible to an individual riding in the cargo basket 17.

Control cord means 35 includes an elastic retractor cord portion 39, as well as a pull cord actuating segment as at 40. Pull cord actuating segment 40 is secured to or otherwise tied to retractor cord 39 at juncture point 41. In this fashion, therefore, cord 35 is maintained in an upward disposition, and generally in an out-of-the-way location by retractor cord portion 39, thereby relieving pull on line 42 when the line element is not intended to be pulled.

Figure 6:
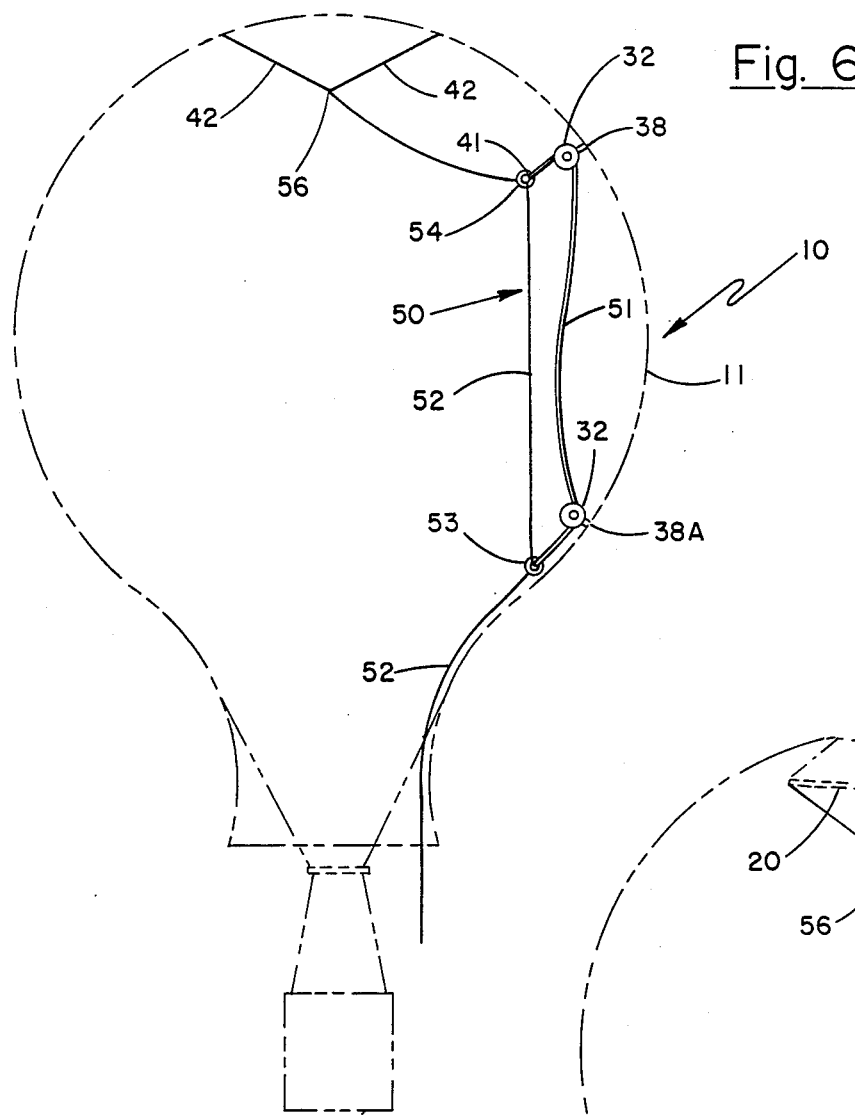
FIG. 6 is a fragmentary view, similar to FIG. 4, and illustrating an alternate arrangement for the cord means functionally attached to the valving disc.
Figure 7:
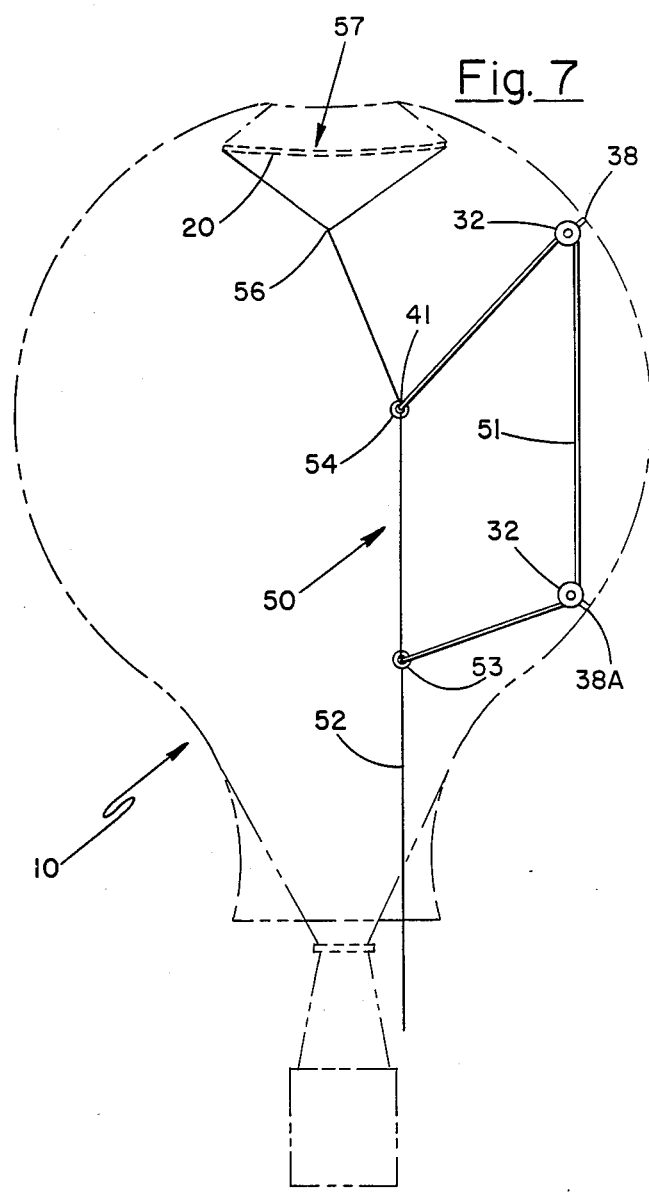
FIG. 7 is a schematic illustration of the disposition of the control cord means of the arrangement of FIG. 6, when the valve disc is in open disposition.

The control cord means 35 further comprises the clew or becket 43 and a plurality of disc cords 42—42 which extend from clew becket 43 to a termination point as at 44, which may conveniently be a juncture point coincident with point 41. Each of the individual lines 42 is preferably equally and arcuately spaced about the circumference of disc 20. Also, as indicated, pulley means 32 is utilized to treat line 30, and ultimately functions in combination with disc cords 42, whenever such cords are actuated. Pulley means 32 are appropriately anchored to the structure as at anchoring rings or points 38 (FIGS. 3 and 5) and similarly at 38A (FIGS. 6 and 7). As previously indicated, pulley means 32 provide for improved angular disposition as compared to longer cord anchored further out and angularly down along seam 13, with this arrangement providing for such an improved angular disposition of the top cap valving disc 20 while in either open or closed disposition. In this fashion, the pull cord acts as a deflation pull cord and permits a pulling force to be applied generally axially through the center of the disc. This arrangement provides for improved articulation and/or motion within disc 20.

Figure 4:
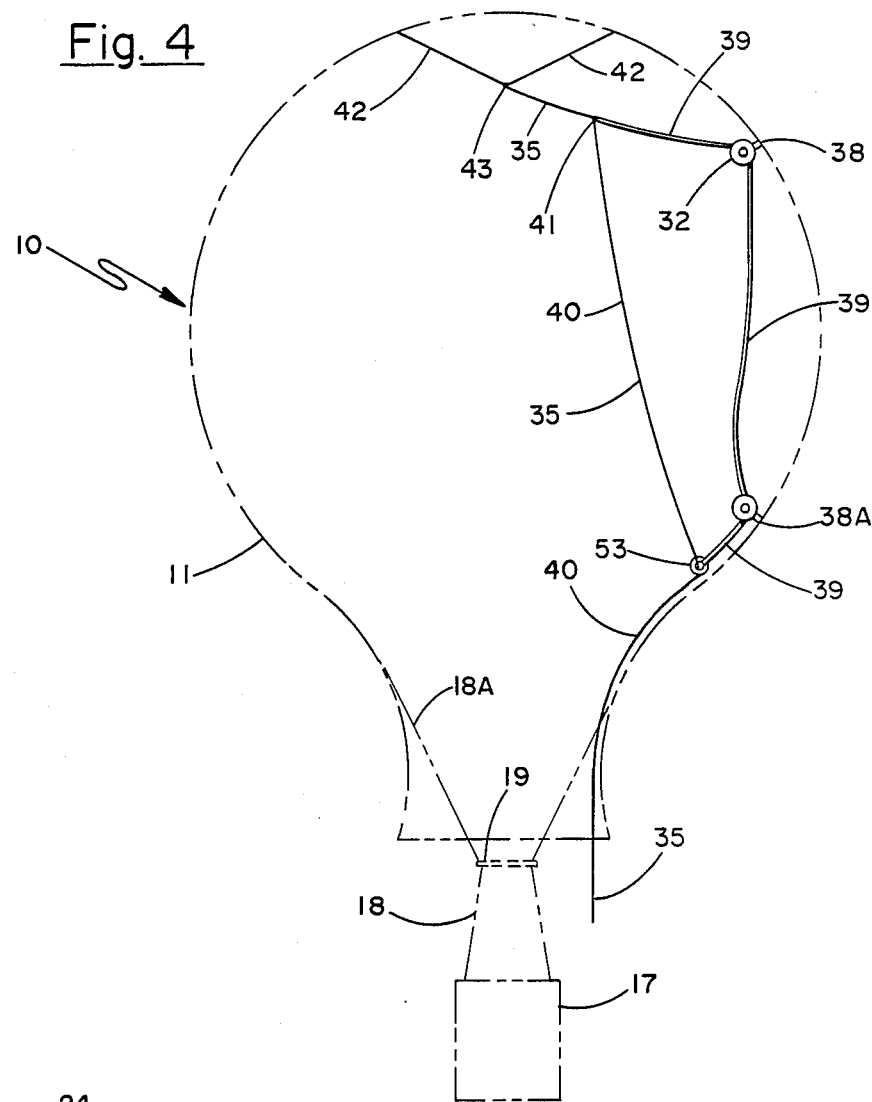
FIG. 4 is a schematic illustration of the disposition of the cord means utilized for controlling the disposition of the valving disc, with the balloon envelope being shown partially in section, and with the load-carrying basket and burner arrangement being illustrated in phantom.

Attention is now directed to FIG. 4 wherein a schematic illustration of the control cord is shown. As indicated, pull cord 40 extends downwardly for actuation and operation by crew members held in basket 17.

Figure 5:
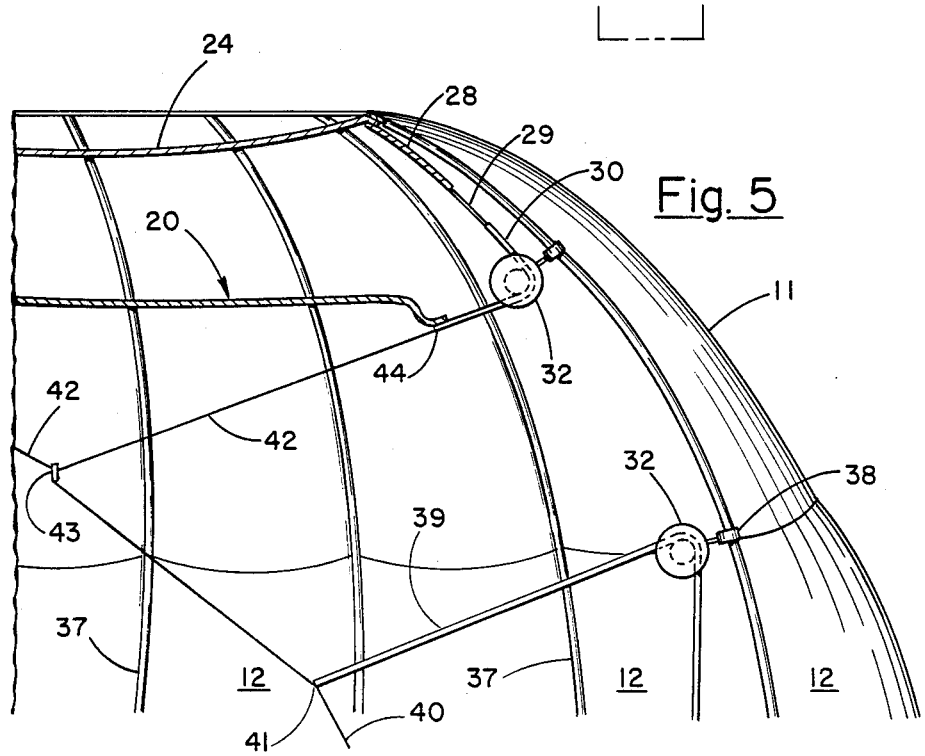
FIG. 5 is a view similar to FIG. 3, and illustrating the disposition of the valving disc when opened.

Attention is now directed to FIG. 5 of the drawings wherein the disc 20 is shown in retracted or venting disposition. Accordingly, when a pulling force has been exerted on pull cord 40, thereby causing a downward pull on clew becket 43, and the individual disc cords 42—42, the top cap valving disc 20 will assume the disposition shown in FIG. 5. Furthermore, the forces generated when a pulling force is exerted on pull cord 40 are shown in somewhat modified form in FIG. 7. Accordingly, with continued attention being directed to FIG. 5 of the drawings, disc 20 is shown retracted, with the annular seal zone 28 being opened, and hot gases from the envelope being permitted to escape and be discharged to atmosphere. Also, in FIG. 5, the lip seal area as at 28 is shown in greater detail, including the lip tie-back member 29 and retractor cord 30.

Attention is now directed to FIG. 6 of the drawings wherein a somewhat modified form of the invention is illustrated. In this embodiment, control line 50 includes a retractor cord 51 and a pull cord 52. Retractor cord 51 terminates at juncture point 41 through knot 54, with pull cord 52 passing through knot 54 and onto clew becket 56. The operation and actuation of this system is substantially the same as that illustrated in the embodiment of FIGS. 3–5, with the exception being that elastic retractor cord 51 terminates at knot 54. As illustrated in FIGS. 4, 6 and 7, slip ring 53 may be provided as a sliding juncture between the retractor cord and pull cord elements. As an alternative, in the design of the arrangement illustrated in FIG. 4, slip ring 53 may alternatively be a fixed juncture point such as a knot.

With attention now being directed to FIG. 7 of the drawings, this view illustrates the arrangement of the control cord system when a downward force has been applied to pull cord 52 so as to open the vent, with disc generally designated 57 being separated from the envelope, and with the seal being accordingly opened. Accordingly, knot 54 provides a fixed juncture between the pull cord 52 and retractor cord 51. Pulley means 32 along with anchor elements 38 and 38A are illustrated in their operative configurations in FIG. 7.

For ease of draftsmanship and comprehension, disc 57 as illustrated in FIG. 7 appears concave when viewed from the outer surface. This disc, in certain operative modes, will, of course, be bowed outwardly so as to appear convex when viewed from the outer surface.

In certain embodiments, it may be desirable to provide a blousing of the lip tie-back element, so as to enhance the integrity of the lip seal. Such an arrangement may be readily undertaken by appropriate cutting of the material involved in forming the seal.

It will be observed that the geometric configurations of the cord control means including the pull cords 40 and/or 52 is such that the pull force exerted by lines 40 and/or 52 at juncture point 41 represents a substantial downward pull being exerted on clew becket 43 (FIG. 4) or bracket 56 (FIGS. 6 and 7) for ease in opening the disc. It will be further noted that the utilization of elastic members in retractor cord 39 as well as in disc cords 30 provide for the smooth exertion of force on disc 20, thus contributing to smoothness of overall operation.

DESCRIPTION OF AN ALTERNATE PREFERRED EMBODIMENT

With attention being directed to FIGS. 8 through 11 of the drawings, an alternative embodiment is illustrated which provides for an additional feature for selective choking of the disc, when desired. In certain situations, it becomes desirable to provide for adequate total deflation of an inflated hot air balloon, and because of the normal tendency of the disc to return to the vent opening, it has sometimes created a problem for the balloon operator.

Figure 8:
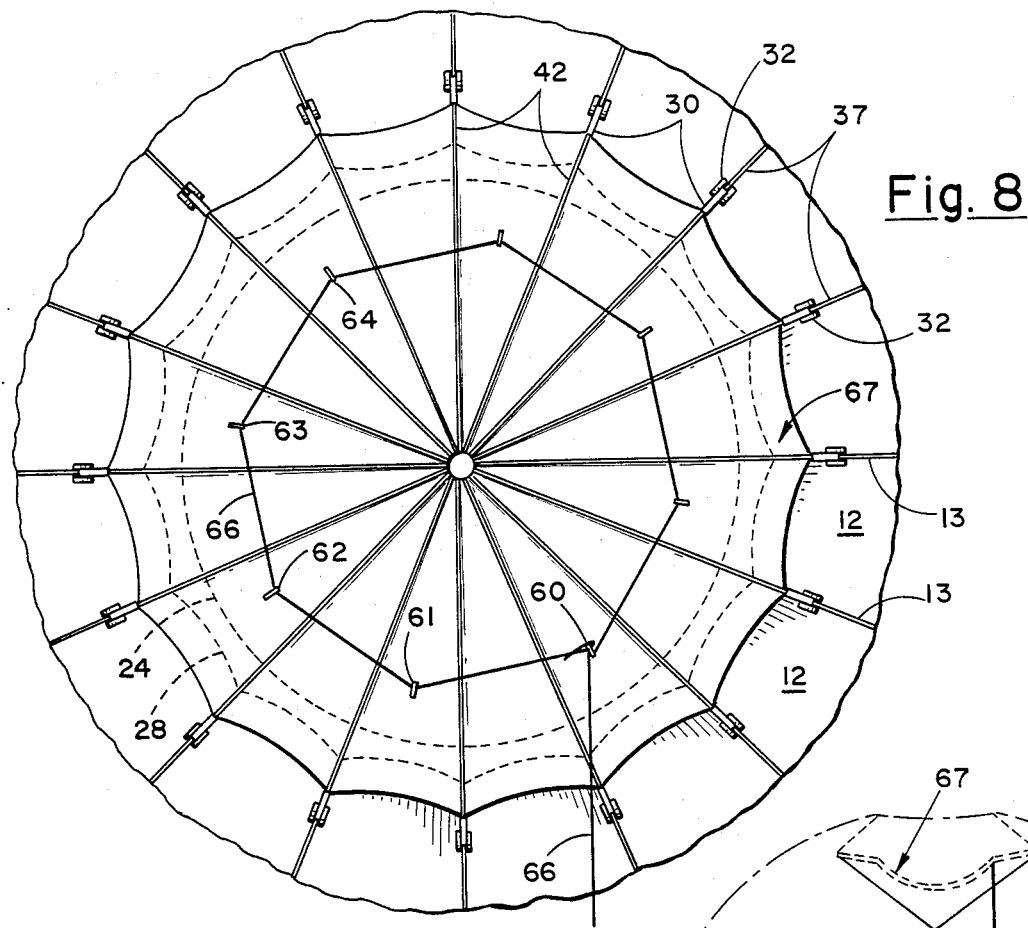
FIG. 8 is a view similar to FIG. 2, and illustrating an alternative embodiment of the present invention wherein a plurality of radially spaced rings are employed for reefing the balloon by choking the disc through a single additional line which passes serially through each of the rings.

With attention being directed to FIG. 8 of the drawings, it will be observed that a plurality of rings such as at 60, 61, 62, 63, 64, as well as additional such rings, not shown, arranged symmetrically about the periphery of disc 20 are provided. Each of the rings 60 through 64, as well as additional such rings are secured such as by sewing or other similar method of attachment to the inner periphery of disc 20. Each such ring is spaced radially inwardly from the outer periphery of disc 20, and is arranged to carry a line such as line 66 therethrough. Line 66 is passed serially through each of the rings and terminating in tied fashion to a single ring through which the line itself is passed prior to its traverse around the plurality of peripherally disposed rings. Ideally, each of the rings 60 through 64 is arranged approximately one-third of the radius of the disc inwardly from the peripheral edge, although other similar spacings may be employed.

Figure 9:
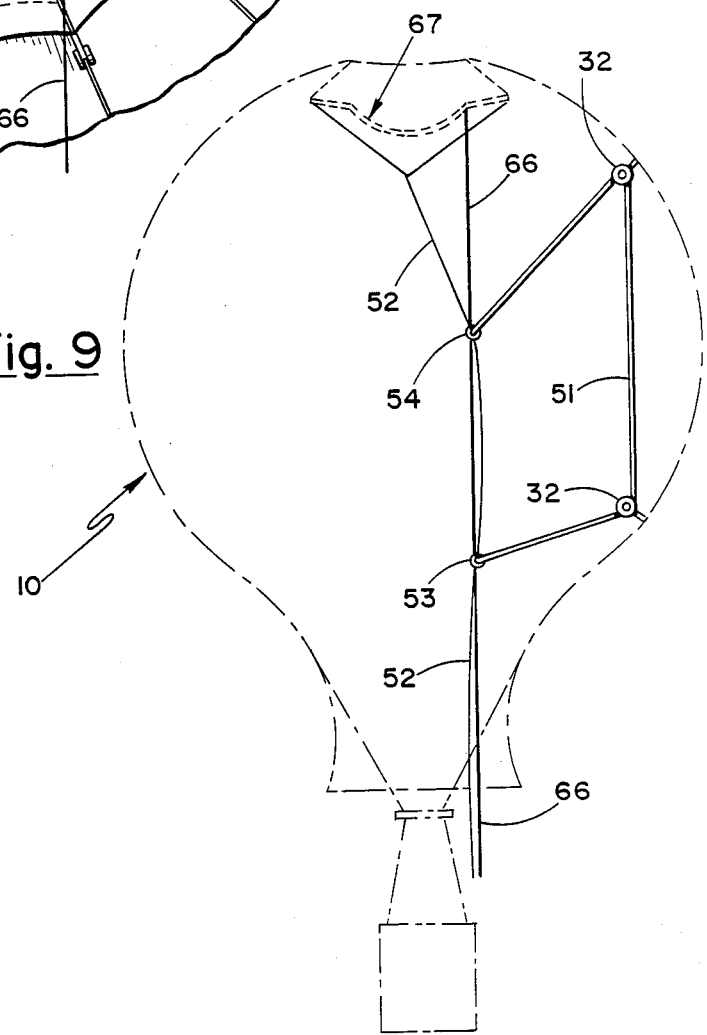
FIG. 9 is a view similar to FIG. 7, and illustrating the embodiment of FIG. 8 therein.

Attention is now directed to FIG. 9 of the drawings wherein the disc is shown in partially choked configuration, with line 66 having been pulled tautly so as to choke and accordingly reduce the radius of the disc as illustrated at 67. Disc 67, which is similar to disc 20 from the modification of FIGS. 1–7, is illustrated in its modified or choked configuration in view of the provision of line 66 which, as previously indicated, passes through each of the rings 60 through 64, as well as other similarly disposed rings, not shown.

Figure 10:
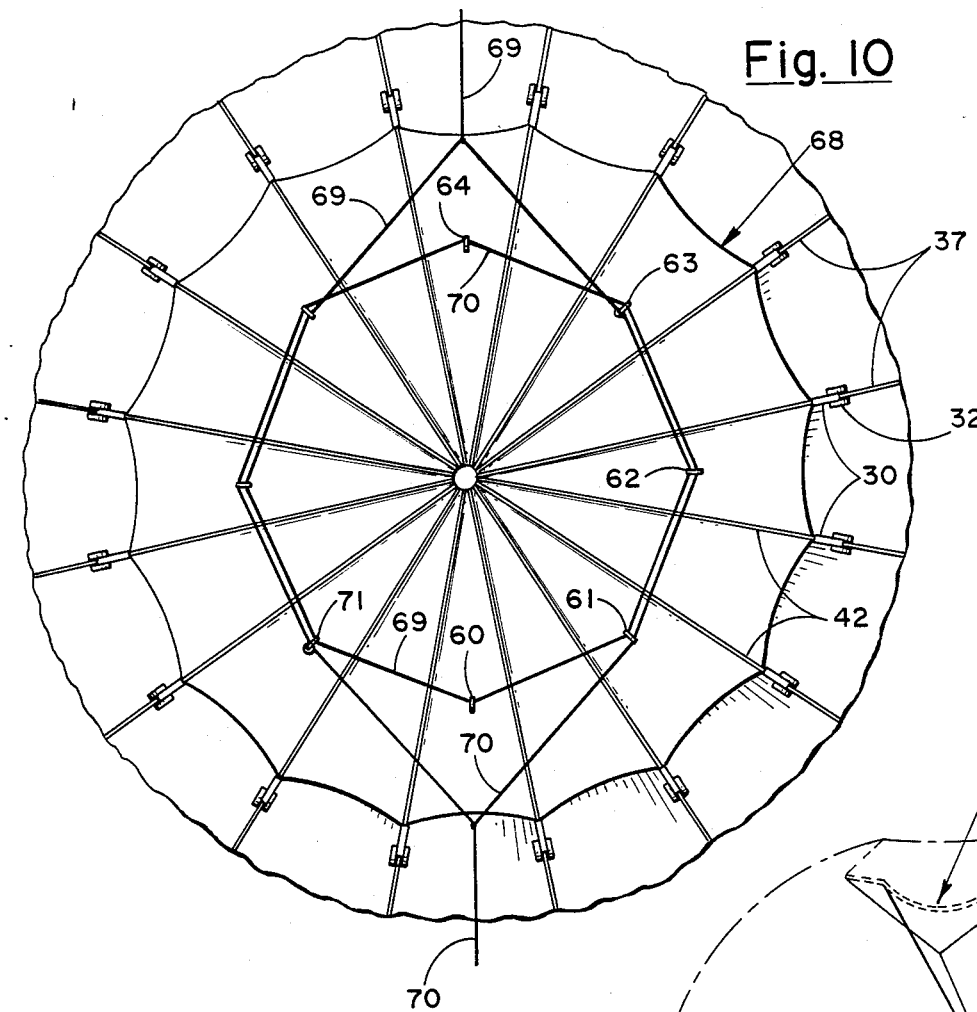
FIG. 10 is a view similar to FIG. 8, and illustrating an arrangement wherein a pair of lines are provided for achieving choking of the disc.
Figure 11:
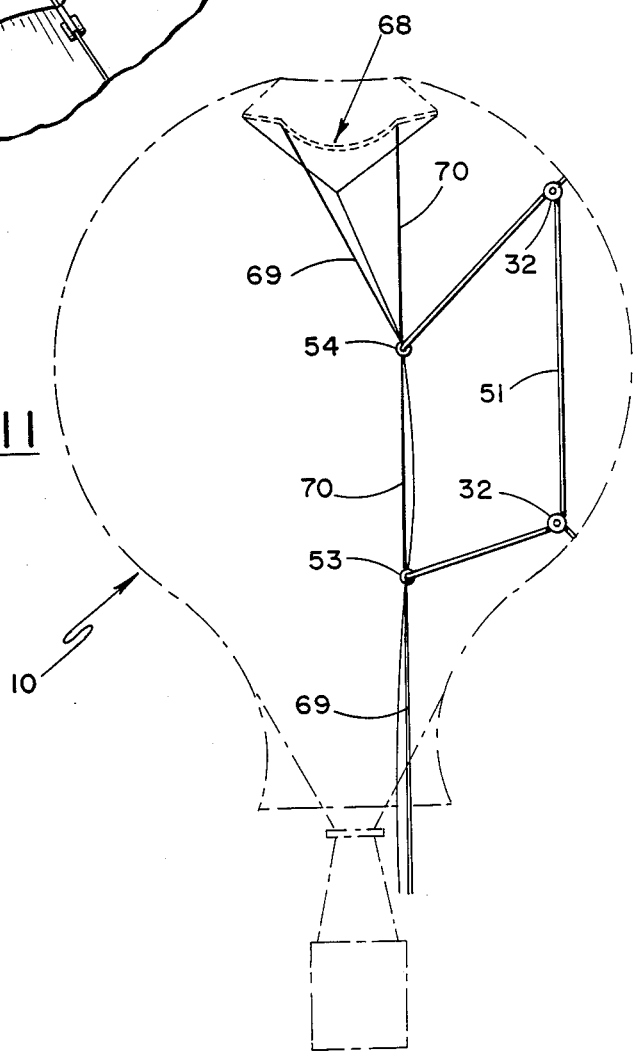
FIG. 11 is a view similar to FIG. 9, and illustrating the system wherein a pair of lines are employed to achieve inward choking of the disc.

Attention is now directed to FIG. 10 of the drawings wherein a modified form of the structure illustrated in FIGS. 9 and 10 is shown. In this arrangement, disc shown generally at 68, corresponds to disc 20 of the modification of FIGS. 1–7, however rings such as rings 60 through 64 are provided. In this connection, therefore, a pair of separate lines 69 and 70 utilized for choking and/or reefing of the disc 68 are provided. Each of these lines 69 and 70 are passed through all but one or more of oppositely disposed rings, with the free end of each line being secured or otherwise tied to itself external to the ring array. At opposed diametrical positions of disc 68, such as at ring 71, each of the lines 69 and 70 is arranged to pass through control or guide ring 71 and thus provide a suitable means for reduction of diameter through choking of disc 68. Lines 69 and 70 cooperate to choke disc 68 about the rings 60–64 and thus aid in control of the inflated balloon.

The arrangement illustrated in the embodiment of FIGS. 8–11 provides a means for adequate total deflation of the balloon, thus permitting venting without risk of having the disc stopped or otherwise interrupt egress of the heated air through the vent opening.

I claim:

1. In a hot air load-carrying balloon structure comprising an envelope supporting a load-carrying cargo basket, a cap valving means comprising a port formed in the envelope at the polar cap thereof, and further comprising a disc removably and releasably secured to the balloon envelope adjacent the disc periphery, and means for controllably and selectively positioning the disc in the port for opened and closed dispositions, characterized in that:
   (a) cord control means coupled to said disc and providing a substantially continuous line extending from said disc to the free gripping end accessible to an individual riding in said cargo basket;
   (b) said disc having a diameter which is substantially greater than the diameter of the port formed within the envelope and providing an annular sealing zone radially outwardly of the port;
   (c) said control cord means comprising a clew disposed generally concentrically with said disc, and a plurality of elastic disc cords extending radially outwardly from said clew and being anchored to said disc at substantially equally arcuately spaced points therearound, said disc cords extending radially outwardly of said disc and with control segments thereof passing about a pulley means disposed radially outwardly of said disc and with said pulley means being anchored to and suspended from said envelope.

2. A hot air load-carrying balloon structure as defined in claim 1 being particularly characterized in that an elastic retractor cord is provided within the balloon structure, with one end thereof being anchored to the clew.

3. The hot air load-carrying balloon structure as defined in claim 2 being particularly characterized in that said elastic retractor cord is also coupled to said cord control means at the end opposed to said clew.

4. The hot air load-carrying balloon structure as defined in claim 1 being particularly characterized in that a purse net means is provided within said port to control the disposition of said disc when in closed disposition.

5. The hot air load-carrying balloon structure as defined in claim 1 being particularly characterized in that means are provided for choking said disc radially inwardly so as to project a disc having a diameter less than that of the port formed in the envelope.

6. The hot air load-carrying balloon structure as defined in claim 1 being particularly characterized in that:
   (a) said sealing zone includes a return lip portion on said balloon envelope to form said annular sealing zone; and
   (b) means for choking said disc radially inwardly so as to project a disc having a diameter less than that to the port formed in the envelope, said choking means including a plurality of rings secured to the disc symmetrically about an inner periphery of the disc, and a line means including at least one line through the rings, whereby pulling said line means taut reduces the radius of the disc.

7. In a hot air load-carrying balloon structure comprising an envelope supporting a load-carrying cargo basket, a cap valving means comprising a port formed in the envelope at the polar cap thereof, and further comprising a disc removably and releasably secured to the balloon envelope adjacent the disc periphery, and means for controllably and selectively positioning the disc in the port for opened and closed dispositions, characterized in that:
   (a) cord control means coupled to said disc and providing a substantially continuous line extending from said disc to the free grippng end accessible to an individual riding in said cargo basket;
   (b) said disc having a diameter which is substantially greater than the diameter of the port formed within the envelope and providing an annular sealing zone radially outwardly of the port;
   (c) said sealing zone includes a return lip portion on said balloon envelope to form said annular sealing zone; and
   (d) means for choking said disc radially inwardly so as to project a disc having a diameter less than that of the port formed in the envelope, said choking means including a plurality of rings secured to the disc symmetrically about an inner periphery of the disc, and a line means including at least one line through the rings, whereby pulling said line means taut reduces the radius of the disc.

* * * * *